(12) United States Patent
Dmitry et al.

(10) Patent No.: US 12,088,349 B2
(45) Date of Patent: Sep. 10, 2024

(54) SIGNAL PRE-COMPENSATION METHOD AND APPARATUS

(71) Applicant: HUAWEI TECHNOLOGIES CO., LTD., GuangDong (CN)

(72) Inventors: Solovev Dmitry, Moscow (RU); Jie Chen, Wuhan (CN); Jiashen Tian, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 32 days.

(21) Appl. No.: 17/941,360

(22) Filed: Sep. 9, 2022

(65) Prior Publication Data

US 2023/0006743 A1 Jan. 5, 2023

Related U.S. Application Data

(63) Continuation of application No. PCT/CN2021/078629, filed on Mar. 2, 2021.

(30) Foreign Application Priority Data

Mar. 13, 2020 (RU) ................................ 2020110701

(51) Int. Cl.
*H04B 10/58* (2013.01)

(52) U.S. Cl.
CPC .................................... *H04B 10/58* (2013.01)

(58) Field of Classification Search
CPC ...................................................... H04B 10/58
(Continued)

(56) References Cited

U.S. PATENT DOCUMENTS

7,756,421 B2 * 7/2010 Roberts .............. H04B 10/2543
398/158
2004/0136413 A1 * 7/2004 Kallmann ............ H04B 10/504
372/20
(Continued)

FOREIGN PATENT DOCUMENTS

| CN | 101675584 A | 3/2010 |
| CN | 103098392 A | 5/2013 |

(Continued)

OTHER PUBLICATIONS

G. Khanna et al., "A Memory Polynomial Based Adaptive Digital Pre-Distorter for Optical Communication Transmitters,", ICTON 2017, Mo.D1.1, 4 total pages.

(Continued)

*Primary Examiner* — Dalzid E Singh
(74) *Attorney, Agent, or Firm* — Rimon PC

(57) ABSTRACT

A signal pre-compensation method is provided. In the method, at least one target frequency subband is determined from a plurality of frequency subbands of a first optical signal and an optical signal of the at least one target frequency subband in the first optical signal is demodulated based on the at least one target frequency subband. A first electrical signal is obtained after demodulation, and a pre-compensation parameter is updated based on the at least one target frequency subband, the first electrical signal, and a second electrical signal. Herein the pre-compensation parameter is used to perform signal pre-compensation on the second electrical signal, and the first optical signal is generated after the pre-compensation is performed on the second electrical signal.

15 Claims, 7 Drawing Sheets

(58) Field of Classification Search
USPC .......................................................... 398/193
See application file for complete search history.

(56) References Cited

U.S. PATENT DOCUMENTS

| | | | |
|---|---|---|---|
| 2004/0151416 A1* | 8/2004 | Galtarossa | H04B 10/2569 385/11 |
| 2013/0120062 A1 | 5/2013 | Lozhkin | |
| 2013/0200951 A1 | 8/2013 | Irvine | |
| 2016/0065312 A1* | 3/2016 | Oyama | H04B 10/6971 398/194 |
| 2016/0352427 A1 | 12/2016 | Anandakumar et al. | |
| 2018/0183521 A1 | 6/2018 | Zhang et al. | |
| 2019/0140605 A1 | 5/2019 | Hong et al. | |

FOREIGN PATENT DOCUMENTS

| | | |
|---|---|---|
| CN | 103401513 A | 11/2013 |
| CN | 104937841 A | 9/2015 |
| CN | 107306241 A | 10/2017 |
| CN | 107911194 A | 4/2018 |
| EP | 3000175 B1 | 2/2019 |
| WO | 2018098629 A1 | 6/2018 |

OTHER PUBLICATIONS

J. K. Cavers, "The Effect of Quadrature Modulator and Demodulator Errors on Adaptive Digital Predistorters for Amplifier Linearization," IEEE Transactions on Vehicular Technology, vol. 46, No. 2, May 1997; 11 total pages (pp. 456-466).

G. Khanna et al., "A Robust Adaptive Pre-Distortion Method for Optical Communication Transmitters," IEEE Photonics Technology Letters, vol. 28, No. 7, Apr. 1, 2016; 4 total pages (pp. 752-755).

Pan Hong et al., "Adaptive Quadrature Modulation Compensation for Direct Conversion Transmitter," 2014 Seventh International Symposium on Computational Intelligence and Design, 2014 IEEE; 4 total pages (pp. 158-161).

Peng Zhan et al., "Nonlinear Behavioral Model for Quadrature Modulators and Compensators," IEEE, 2011; 4 total pages (pp. 437-440).

P. W. Berenguer et al., "Nonlinear Digital Pre-Distortion of Transmitter Components," Journal of Lightwave Technology, vol. 34, No. 8, Apr. 15, 2016; 7 total pages (pp. 1739-1745).

Kai Fang et al., "Research on linearisation of power amplifier based on digital pre-distortion," The Journal of Engineering, vol. 2019, Issue 21, (2019); 4 total pages (pp. 7339-7342).

A. Lozhkin et al., "Adaptive Linearization through Narrowband Feedback," Vehicular Technology Conference, May 2012, ResearchGate; 7 total pages.

* cited by examiner

SIGNAL PRE-COMPENSATION METHOD AND APPARATUS

CROSS-REFERENCE TO RELATED APPLICATIONS

This application is a continuation of International Application No. PCT/CN2021/078629, filed on Mar. 2, 2021, which claims priority to Russian Patent Application No. RU2020110701, filed on Mar. 13, 2020. The disclosures of the aforementioned applications are hereby incorporated by reference in their entireties.

TECHNICAL FIELD

This application relates to the communications field, and more specifically, to a signal pre-compensation method and apparatus.

BACKGROUND

In a conventional optical communications system, as modulation format gradually evolves from quadrature phase shift keying (QPSK) to 64 quadrature amplitude modulation (QAM) or a modulation code pattern with a higher numeration system, and the transmission rate of the optical communications system also evolves from 30 gigabits per second (Gbps) to 100 Gbps, signal distortion caused by devices at the transmit end has more significant impact on information transmission.

To resolve the foregoing problem, a digital pre-compensation (or digital pre-distortion) technology for the transmit end is proposed. Simply put, pre-distortion is artificially adding a characteristic that is opposite to the distortion at the transmit end in order to perform compensation.

FIG. 1 is a schematic diagram of a pre-compensation technology in a conventional optical communications system. As shown in FIG. 1, a receive end generates feedback information based on a received signal, and feeds back the feedback information to a transmit end, so that the transmit end updates (or calibrates) a pre-compensation parameter based on the feedback information.

However, implementation of this solution depends on a remote feedback channel, and has particular requirements for both the performance and the rate of the feedback channel. For example, in a case of a long distance between the transmit end and the receive end, transmission of the feedback information has a transmission delay, and the delay postpones the updating of the pre-compensation parameter. In addition, when the performance of the feedback channel is poor, the transmission accuracy of the feedback information is affected, thereby affecting the accuracy of the pre-compensation parameter. Consequently, communication performance is degraded.

SUMMARY

This application provides a signal pre-compensation method and apparatus, so as to improve communication performance.

According to a first aspect, a signal pre-compensation method is provided, where the method is applied to an optical signal sending device, and includes: determining at least one target frequency subband from a plurality of frequency subbands, where the plurality of frequency subbands are frequency subbands in a frequency band of a first optical signal generated by the optical signal sending device; demodulating an optical signal of the at least one target frequency subband in the first optical signal based on the at least one target frequency subband, and obtaining a first electrical signal after demodulation; and updating a pre-compensation parameter based on the at least one target frequency subband, the first electrical signal, and a second electrical signal, where the pre-compensation parameter is used to perform signal pre-compensation on the second electrical signal, and the first optical signal is generated after the pre-compensation is performed on the second electrical signal.

According to the solutions provided in this application, the optical signal sending device pre-compensates and modulates the second electrical signal to obtain a to-be-sent first optical signal, and demodulates the first optical signal to obtain the first electrical signal, so that the pre-compensation parameter used for pre-compensation can be updated based on the first electrical signal and the second electrical signal. To be specific, according to the method provided in this application, the updating of the pre-compensation parameter does not need to depend on feedback information from an optical signal receiving device, thereby reducing system configuration costs generated by configuring a feedback channel, shortening the delay of updating the pre-compensation parameter, improving the accuracy of pre-compensation processing, and further improving communication performance.

In addition, according to the solutions provided in this application, demodulation of the first optical signal is demodulation of a part of the first optical signal carried on the target frequency subband, thereby lowering a requirement for a bandwidth of a demodulation device, making it easy to implement demodulation processing, and reducing the costs of the optical signal sending device. Therefore, practicality of this application is further improved.

In this application, "demodulating an optical signal of the at least one target frequency subband in the first optical signal" may be understood as follows: An execution body (for example, a computing device or a processor) of the signal pre-compensation method sends information about the target frequency subband to a demodulation device that is configured in the optical signal sending device, so that the demodulation device can demodulate an optical signal carried on the target frequency subband.

Alternatively, "demodulating an optical signal of the at least one target frequency subband in the first optical signal" may be understood as follows: The execution body of the signal pre-compensation method performs a related step of the demodulation.

In other words, the demodulation device in the optical signal sending device and the execution body of the signal pre-compensation method in this application may be independently configured, or may be the same device. This is not particularly limited in this application.

In addition, in this application, a pre-compensation device or module configured to perform the pre-compensation processing may be configured in the optical signal sending device, and an updated pre-compensation parameter may be sent to the pre-compensation device or module by the execution body of the signal pre-compensation method in this application.

Alternatively, the pre-compensation processing may be performed by the execution body of the signal pre-compensation method in this application. This is not particularly limited in this application.

Optionally, the demodulating an optical signal of the at least one target frequency subband in the first optical signal based on the at least one target frequency subband includes: generating at least one local oscillator signal based on the at least one target frequency subband, where the at least one target frequency subband is in a one-to-one correspondence with the at least one local oscillator signal, and a deviation between a center frequency of each local oscillator signal and a center frequency of a corresponding target frequency subband falls within a first preset range; and demodulating the first optical signal based on the at least one local oscillator signal and a first demodulation bandwidth, where the first demodulation bandwidth is greater than or equal to a frequency bandwidth of the target frequency subband.

In this application, "generating a local oscillator signal based on the target frequency subband" may be understood as follows: The execution body (for example, a computing device or a processor) of the signal pre-compensation method sends the information about the target frequency subband to a local oscillator source that is configured in the optical signal sending device, so that the local oscillator source can generate a local oscillator signal related to the target frequency subband.

Alternatively, "generating a local oscillator signal based on the target frequency subband" may be understood as follows: The execution body of the signal pre-compensation method performs a related step of generating the local oscillator signal.

Optionally, the at least one target frequency subband is a plurality of target frequency subbands, the plurality of target frequency subbands are in a one-to-one correspondence with a plurality of first electrical signals, and each first electrical signal is obtained after an optical signal of a corresponding target frequency subband is demodulated.

Optionally, the updating a pre-compensation parameter based on the at least one target frequency subband, the first electrical signal, and a second electrical signal includes: determining a first symbol subsequence from a symbol sequence of the second electrical signal based on the at least one target frequency subband, where a position of the first symbol subsequence in the symbol sequence of the second electrical signal is a first position, a position of the at least one target frequency subband in the plurality of frequency subbands is a second position, and a deviation between the first position and the second position falls within a second preset range; and updating the pre-compensation parameter based on the difference between the symbol sequence of the first electrical signal and the first symbol subsequence.

Optionally, the updating the pre-compensation parameter based on the difference between the symbol sequence of the first electrical signal and the first symbol subsequence includes: determining a first weight based on the frequency band position of the at least one target frequency subband in the plurality of frequency subbands; and updating the pre-compensation parameter based on the first weight and the difference between the symbol sequence of the first electrical signal and the first symbol subsequence.

Optionally, the plurality of frequency subbands have the same frequency bandwidth.

Optionally, the at least one target frequency subband is a plurality of target frequency subbands, and the plurality of target frequency subbands are selected from the plurality of frequency subbands at an equal frequency band interval.

Optionally, the frequency band interval is one frequency subband.

According to a second aspect, a signal pre-compensation apparatus is provided, where the apparatus is used in an optical signal sending device, and includes: a determining unit, configured to determine at least one target frequency subband from a plurality of frequency subbands, where the plurality of frequency subbands are frequency subbands in a frequency band of a first optical signal generated by the optical signal sending device; a demodulation unit, configured to: demodulate an optical signal of the at least one target frequency subband in the first optical signal based on the at least one target frequency subband, and obtain a first electrical signal after demodulation; and a processing unit, configured to update a pre-compensation parameter based on the at least one target frequency subband, the first electrical signal, and a second electrical signal, where the pre-compensation parameter is used to perform signal pre-compensation on the second electrical signal, and the first optical signal is generated after the pre-compensation is performed on the second electrical signal.

Optionally, the demodulation unit is configured to generate at least one local oscillator signal based on the at least one target frequency subband, where the at least one target frequency subband is in a one-to-one correspondence with the at least one local oscillator signal, and a deviation between a center frequency of each local oscillator signal and a center frequency of a corresponding target frequency subband falls within a first preset range, and is configured to demodulate the first optical signal based on the at least one local oscillator signal and a first demodulation bandwidth, where the first demodulation bandwidth is greater than or equal to a frequency bandwidth of the at least one target frequency subband.

Optionally, the at least one target frequency subband is a plurality of target frequency subbands, the plurality of target frequency subbands are in a one-to-one correspondence with a plurality of first electrical signals, and each first electrical signal is obtained after an optical signal of a corresponding target frequency subband is demodulated.

Optionally, the processing unit is configured to determine a first symbol subsequence from a symbol sequence of the second electrical signal based on the at least one target frequency subband, where a position of the first symbol subsequence in the symbol sequence of the second electrical signal is a first position, a position of the at least one target frequency subband in the plurality of frequency subbands is a second position, and a deviation between the first position and the second position falls within a second preset range, and is configured to update the pre-compensation parameter based on the difference between the symbol sequence of the first electrical signal and the first symbol subsequence.

Optionally, the processing unit is configured to determine a first weight based on the frequency band position of the at least one target frequency subband in the plurality of frequency subbands, and is configured to update the pre-compensation parameter based on the first weight and the difference between the symbol sequence of the first electrical signal and the first symbol subsequence.

Optionally, the plurality of frequency subbands have the same frequency bandwidth.

Optionally, the at least one target frequency subband is a plurality of target frequency subbands, and the plurality of target frequency subbands are selected from the plurality of frequency subbands at an equal frequency band interval.

Optionally, the frequency band interval is one frequency subband.

According to a third aspect, a signal pre-compensation method is provided, where the method is applied to an optical signal sending device, and includes: demodulating a first optical signal, and obtaining a first electrical signal after demodulation; and updating a pre-compensation parameter based on the first electrical signal and a second electrical signal. The first optical signal is obtained after pre-compensation processing that is based on the pre-compensation parameter is performed on the second electrical signal.

According to a fourth aspect, a signal pre-compensation apparatus is provided, where the apparatus is used in an optical signal sending device, and includes: a demodulation unit, configured to demodulate a first optical signal and obtain a first electrical signal after demodulation; and a processing unit, configured to update a pre-compensation parameter based on the first electrical signal and a second electrical signal. The first optical signal is obtained after pre-compensation processing that is based on the pre-compensation parameter is performed on the second electrical signal.

According to the solutions provided in this application, the optical signal sending device pre-compensates and modulates the second electrical signal to obtain a to-be-sent first optical signal, and demodulates the first optical signal to obtain the first electrical signal, so that the pre-compensation parameter used for pre-compensation can be updated based on the first electrical signal and the second electrical signal. To be specific, according to the method provided in this application, the updating of the pre-compensation parameter does not need to depend on feedback information from an optical signal receiving device, thereby reducing system configuration costs generated by configuring a feedback channel, shortening the delay of updating the pre-compensation parameter, improving accuracy of pre-compensation processing, and further improving communication performance.

According to a fifth aspect, a communications apparatus is provided and includes each module or unit configured to perform the method in any one of the first aspect or the possible implementations of the first aspect.

According to a sixth aspect, a communications apparatus is provided, including modules or units configured to perform the method in the third aspect.

According to a seventh aspect, a communications apparatus is provided, including a processor. The processor is coupled to a memory, and may be configured to perform the method in the first aspect or the third aspect and the possible implementations of the first aspect or the third aspect. Optionally, the communications apparatus further includes the memory. Optionally, the communications apparatus further includes a communications interface, and the processor is coupled to the communications interface.

In an implementation, the communications apparatus is an optical signal sending apparatus. In this case, the communications interface may be a transceiver, or an input/output interface.

In another implementation, the communications apparatus is a chip or a chip system. In this case, the communications interface may be an input/output interface, an interface circuit, an output circuit, an input circuit, a pin, a related circuit, or the like in the chip or the chip system. The processor may alternatively be embodied as a processing circuit or a logic circuit.

According to an eighth aspect, a communications apparatus is provided, including an input circuit, an output circuit, and a processing circuit. The processing circuit is configured to receive a signal by using the input circuit and transmit a signal by using the output circuit, so that the method in any one of the first aspect or the third aspect and the possible implementations of the first aspect or the third aspect is implemented.

In a specific implementation process, the communications apparatus may be a chip, the input circuit may be an input pin, the output circuit may be an output pin, and the processing circuit may be a transistor, a gate circuit, a trigger, various logic circuits, or the like. An input signal received by the input circuit may be received and input by, for example without limitation to, a receiver, and a signal output by the output circuit may be output to and transmitted by, for example without limitation to, a transmitter. The input circuit and the output circuit may be different circuits or may be the same circuit, and in this case, the circuit is used as the input circuit and the output circuit respectively at different moments. Specific implementations of the processor and the various circuits are not limited in embodiments of this application.

According to a ninth aspect, a processing apparatus is provided, including a processor and a memory. The processor is configured to read instructions stored in the memory, and may receive the signal by using a receiver and transmit the signal by using a transmitter to perform the method in any one of the first aspect or the third aspect and the possible implementations of the first aspect or the third aspect.

Optionally, there are one or more processors, and there are one or more memories.

Optionally, the memory may be integrated with the processor, or the memory and the processor are separately disposed.

In a specific implementation process, the memory may be a non-transitory memory, for example, a read-only memory (ROM). The memory and the processor may be integrated into the same chip, or may be separately disposed on different chips. A type of the memory and a manner of disposing the memory and the processor are not limited in embodiments of this application.

It should be understood that a related data exchange process, for example, sending indication information, may be a process of outputting the indication information from the processor, and receiving capability information may be a process of receiving the input capability information by the processor. Specifically, data output by the processor may be output to the transmitter, and input data received by the processor may be from the receiver. The transmitter and the receiver may be collectively referred to as a transceiver.

The processor in the ninth aspect may be a chip. The processor may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may exist independently outside the processor.

According to a tenth aspect, a computer program product is provided. The computer program product includes a computer program (which may be alternatively referred to as code or instructions). When the computer program is run, a computer is enabled to perform the method in any one of the first aspect or the third aspect and the possible implementations of the first aspect or the third aspect.

According to an eleventh aspect, a computer-readable medium is provided. The computer-readable medium stores a computer program (which may be alternatively referred to as code or instructions). When the computer program is run on a computer, the computer is enabled to perform the method in any one of the first aspect or the third aspect and the possible implementations of the first aspect or the third aspect.

According to a twelfth aspect, a communications system is provided, including the foregoing optical signal sending device.

DESCRIPTION OF EMBODIMENTS

The following describes technical solutions of this application with reference to the accompanying drawings.

The signal pre-compensation method according to embodiments of this application may be applied to an optical communications system, such as a coherent optical communications system or an optical communications system using intensity modulation with direct detection.

The signal pre-compensation method in this application may be applied to an optical signal sending device. In the following embodiments, a sending device in the coherent optical communications system is used as an example for description. Coherent modulation and heterodyne detection technologies are mainly used in coherent optical communication. The so-called coherent modulation means that a to-be-transmitted signal is used to change a frequency, a phase, and an amplitude of an optical carrier, and therefore, an optical signal needs to have a definite frequency and phase. Laser is a type of coherent light. The so-called heterodyne detection means that a laser beam generated by a local oscillator and input signal light are mixed in an optical hybrid to obtain an intermediate frequency signal that changes according to the same rule as the signal light in terms of frequency, phase, and amplitude.

Specifically, in the coherent optical communications system, the sending device modulates the signal to the optical carrier in an external modulation method for transmission. When signal light is transmitted to a receiving device, the signal light is first coherently coupled to a local oscillator optical signal and then detected by a balanced receiver. The coherent optical communication may be classified into heterodyne detection and homodyne detection based on a fact that a local oscillator light frequency is unequal or equal to a signal light frequency. For the heterodyne detection, after optical-to-electrical conversion is performed on the optical signal, an intermediate frequency signal is obtained, and then secondary demodulation is required to convert the intermediate frequency signal into a baseband signal. For the homodyne detection, the signal is converted into a baseband signal directly after the optical-to-electrical conversion without requiring the secondary demodulation, provided that the local oscillator light frequency needs to match the signal light frequency strictly, and phases of the local oscillator light and the signal light need to be locked.

Figure 1:
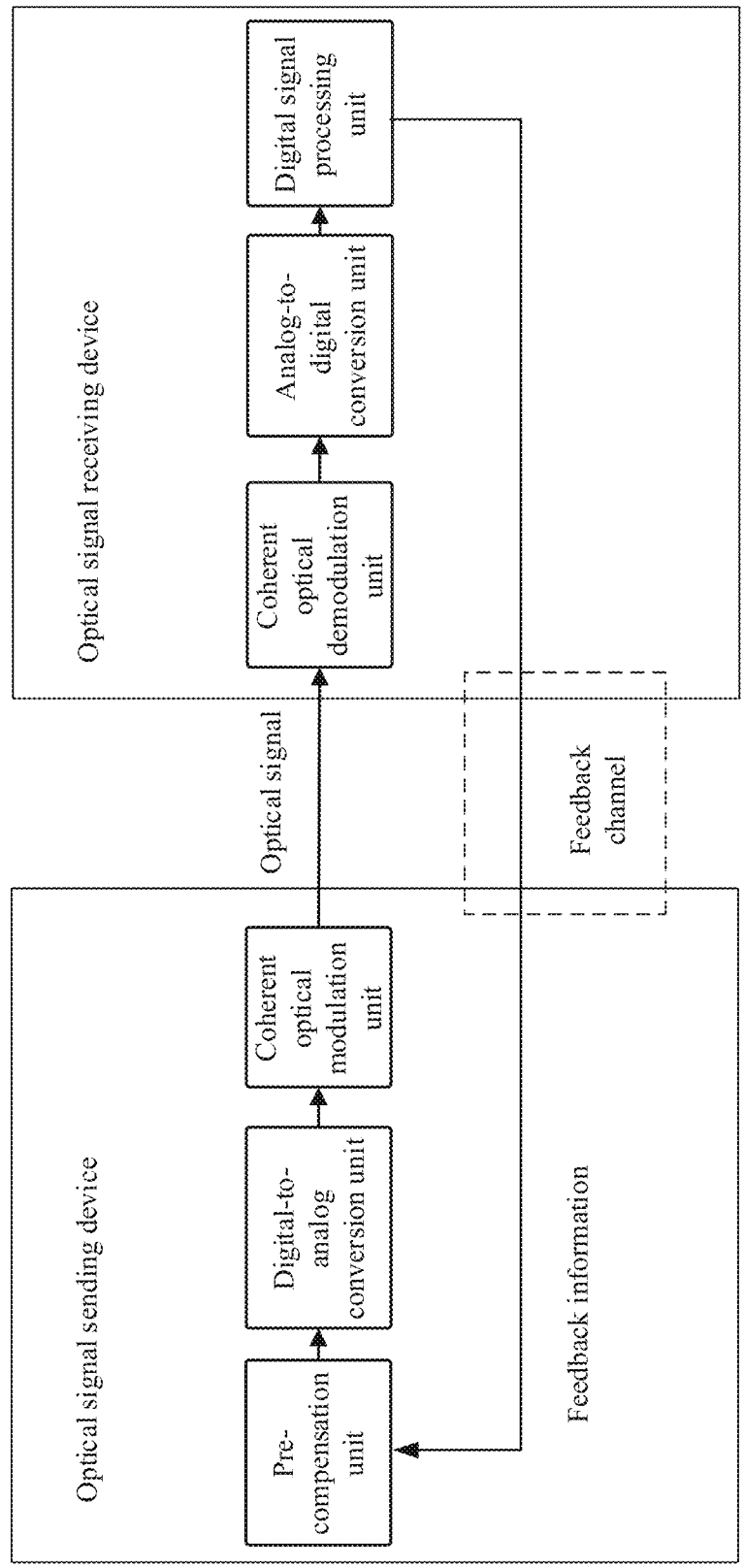
FIG. 1 is a schematic diagram of a pre-compensation technology in the conventional technology.
Figure 2:
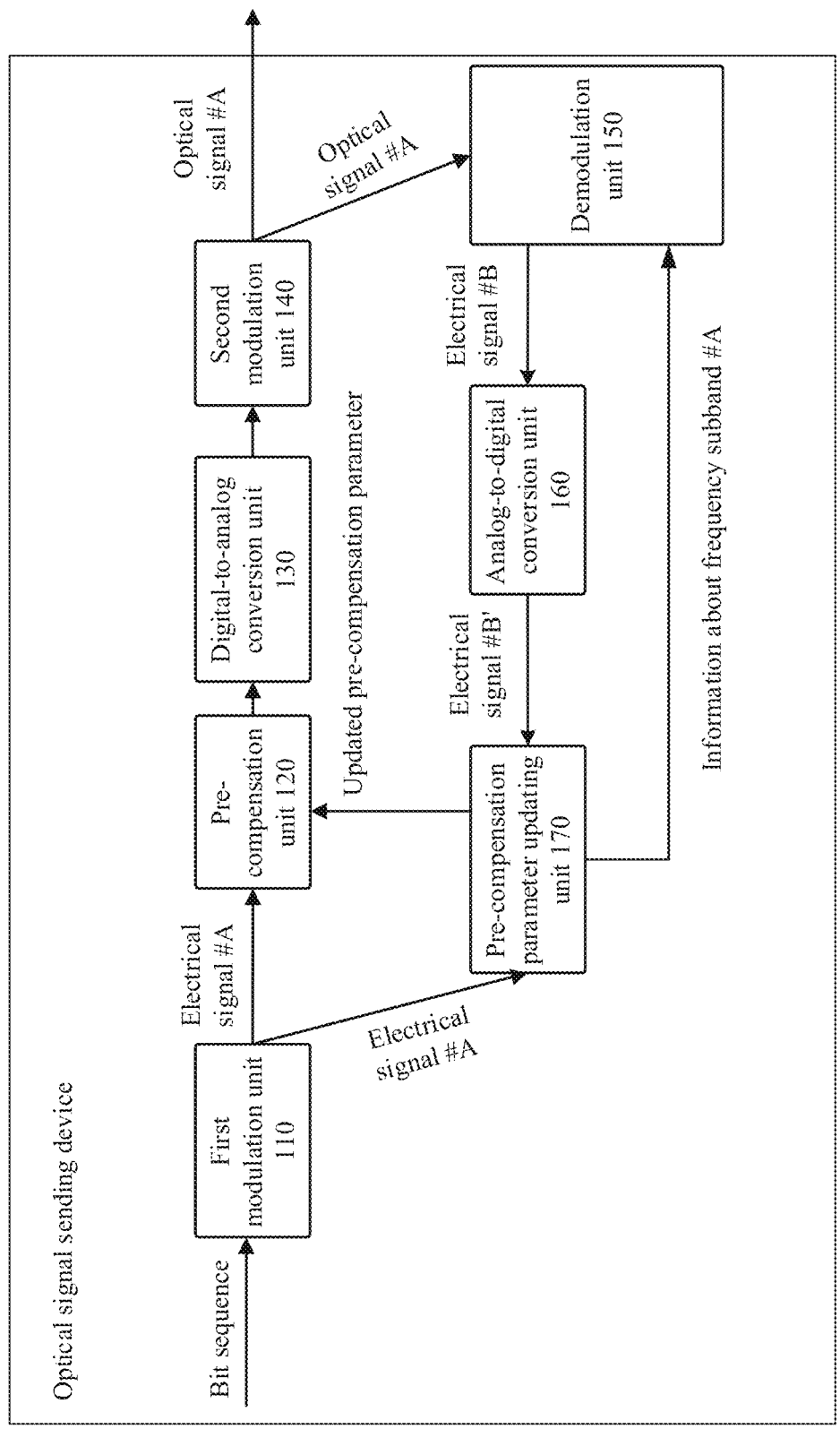
FIG. 2 is a schematic diagram of a structure of an optical signal sending device according to an embodiment of this application.

FIG. 2 is a schematic diagram of a structure of a sending device (or an optical module in a sending device) according to this application.

As shown in FIG. 2, a sending device 100 includes a first modulation unit 110, a pre-compensation unit 120, a digital-to-analog conversion unit 130, a second modulation unit 140, a demodulation unit 150, an analog-to-digital conversion unit 160, and a pre-compensation parameter updating unit 170.

It should be understood that the units included in the sending device listed above are merely examples for description. This is not limited in this application. The sending device 100 in this application may include various units or modules used in optical signal generation and sending processes in the conventional technology.

The following first describes a connection relationship of each module.

An output port of the first modulation unit 110 is separately connected to a first input port of the pre-compensation unit 120 and a first input port of the pre-compensation parameter updating unit 170. To be specific, a signal output from the output port of the first modulation unit 110 can be separately input to the first input port of the pre-compensation unit 120 and the first input port of the pre-compensation parameter updating unit 170.

As an example rather than a limitation, in this application, a splitter may be alternatively disposed. The splitter is configured to: split the signal output from the output port of the first modulation unit 110 into two signals, and input the two signals to the first input port of the pre-compensation unit 120 and the first input port of the pre-compensation parameter updating unit 170, respectively.

An output port of the pre-compensation unit 120 is connected to an input port of the digital-to-analog conversion unit 130. To be specific, a signal output from the output port of the pre-compensation unit 120 can be input to the input port of the digital-to-analog conversion unit 130.

An output port of the digital-to-analog conversion unit 130 is connected to an input port of the second modulation unit 140. To be specific, a signal output from the output port of the digital-to-analog conversion unit 130 can be input to the input port of the second modulation unit 140.

An output port of the second modulation unit 140 is connected to a first input port of the demodulation unit 150. To be specific, a signal output from the output port of the second modulation unit 140 can be input to the first input port of the demodulation unit 150.

As an example rather than a limitation, in this application, the splitter may be alternatively disposed. The splitter is configured to split the signal output from the output port of the second modulation unit 140 into two signals. One signal is sent to a receiving device, and the other signal is input to the first input port of the demodulation unit 150.

An output port of the demodulation unit 150 is connected to an input port of the analog-to-digital conversion unit 160. To be specific, a signal output from the output port of the demodulation unit 150 can be input to the input port of the analog-to-digital conversion unit 160.

An output port of the analog-to-digital conversion unit 160 is connected to a second input port of the pre-compensation parameter updating unit 170. To be specific, a signal output from the output port of the analog-to-digital conversion unit 160 can be input to the second input port of the pre-compensation parameter updating unit 170.

A first output port of the pre-compensation parameter updating unit 170 is connected to a second input port of the pre-compensation unit 120. To be specific, signaling or an instruction output from an output port of the pre-compensation parameter updating unit 170 can be input to the second input port of the pre-compensation unit 120.

A second output port of the pre-compensation parameter updating unit 170 is connected to a second input port of the demodulation unit 150. To be specific, signaling or an instruction output from the second output port of the pre-compensation parameter updating unit 170 can be input to the second input port of the demodulation unit 150.

The following describes functions of the foregoing units.

1. First Modulation Unit 110

The first modulation unit 110 is configured to modulate an input signal (for example, a bit sequence) to generate an electrical signal (that is, an example of a second electrical signal, which is denoted as an electrical signal #A below for ease of understanding and description).

The electrical signal #A may be alternatively understood as a symbol or a symbol sequence in time domain.

As an example rather than a limitation, the bit sequence may be data output by an application layer entity of the sending device, such as a media access control layer (MAC) entity.

As an example rather than a limitation, the first modulation unit 110 may perform processing based on, for example, quadrature amplitude modulation (QAM).

It should be understood that the function of the first modulation unit 110 listed above is merely an example for description. This is not limited in this application. The first modulation unit 110 may also perform other processing for generating a time domain signal in the conventional technology, for example, shaping filter processing.

2. Pre-Compensation Unit 120

The pre-compensation unit 120 may include, for example, a digital pre-distorter (DPD), configured to perform pre-compensation processing, or pre-distortion (Digital Pre-Distortion) processing on the electrical signal #A.

A principle of pre-distortion is that a pre-distortion element such as the DPD is cascaded with a power amplifier element (the power amplifier element may be an element in the second modulation unit 140 described above). A non-linear distortion function is embedded into a digital baseband signal processing domain. Distortion of the non-linear distortion function is comparable ("equal") to distortion presented by an amplifier, but the non-linear distortion function is opposite to the distortion function of the amplifier. The combination of these two non-linear distortion functions can implement a highly linear system with less distortion. A challenge of a digital pre-distortion technology is that a distortion (that is, non-linearity) characteristic of the power amplifier element changes with time, temperature, and bias voltage, and varies from device to device. Therefore, although it is possible to determine a characteristic and design a correct pre-distortion algorithm for a device, it is not economically feasible to do so for each device. To correct the foregoing deviation, a parameter used by a pre-distortion algorithm may be updated (or corrected) in this application, and the process is subsequently described in detail with reference to the following description of a signal pre-compensation method 200.

It should be understood that the function and processing process of the pre-compensation unit 120 listed above are merely examples for description. This is not limited in this application. Various processes in which the pre-compensation unit 120 performs the pre-compensation processing based on a pre-compensation parameter in the conventional technology all fall within a protection scope of this application.

3. Digital-to-Analog Conversion Unit 130

The digital-to-analog conversion unit 130 is configured to perform digital-to-analog conversion on the electrical signal #A. This process may be similar to that in the conventional technology. To avoid repetition, detailed description thereof is omitted.

4. Second Modulation Unit 140

The second modulation unit 140 is configured to modulate a signal output from the digital-to-analog conversion unit 130 to generate an optical signal (that is, an example of a first optical signal, which is denoted as an optical signal #A below for ease of understanding and differentiation) to be sent to the receiving device.

As an example rather than a limitation, the modulation may be coherent modulation. The coherent modulation is a modulation technology in which a to-be-transmitted signal is used to change a frequency, a phase, and an amplitude of a coherent optical carrier.

For example, the second modulation unit 140 may include a Mach-Zehnder modulator (MZM). The MZM is two optical tributaries that divide input light into two equal signals, which separately enter a modulator. Materials used for the two optical tributaries are electro-optic materials whose refractive index changes with a magnitude of an externally applied electrical signal. Because a change of the refractive index of the optical tributary causes a change of a signal phase, when signals of the two tributaries are combined again at the output end of the modulator, a combined optical signal is an interference signal with varying intensities, and this is equivalent to converting a change of the electrical signal into a change of the optical signal, thereby implementing modulation of optical intensity. In short, the modulator may implement modulation of different sidebands by controlling a bias voltage of the modulator.

It should be understood that the function of the second modulation unit 140 listed above is merely an example for description. This is not limited in this application. The second modulation unit 140 may also perform other processing for generating an optical signal in the conventional technology.

5. Demodulation Unit 150

The demodulation unit 150 is configured to demodulate the foregoing optical signal #A.

As an example rather than a limitation, the demodulation may be coherent demodulation. The coherent demodulation, also referred to as synchronous detection, is applicable to demodulation of all linearly modulated signals. A key to implementing the coherent demodulation is that a receive end needs to restore a coherent carrier that is strictly synchronized with a modulated carrier.

The coherent demodulation means inputting, by using a multiplier, a reference signal coherent with (in the same frequency and phase as) a carrier to be multiplied by the carrier.

For example, after an original signal K is modulated with a carrier $\cos(\omega t+\theta)$, a signal $K\cos(\omega t+\theta)$ is obtained.

When a coherent (co-frequency and co-phase) reference signal cos(ωt+θ) is introduced during demodulation, it can be learned that:

$$K\cos(\omega t+\theta)\cos(\omega t+\theta)$$

By using a product to sum formula, it can be learned that $$K*1/2*[\cos(\omega t+\theta+\omega t+\theta)+\cos(\omega t+\theta-\omega t-\theta)] =$$
$$K*1/2*[\cos(2\omega t+2\theta)+\cos(0)] =$$
$$K/2*[\cos(2\omega t+2\theta)+1] = K/2+K/2\cos(2\omega t+2\theta)$$

A high-frequency signal cos(ωt+θ) is filtered out by using a low-pass filter, to obtain the original signal K.

Figure 3:
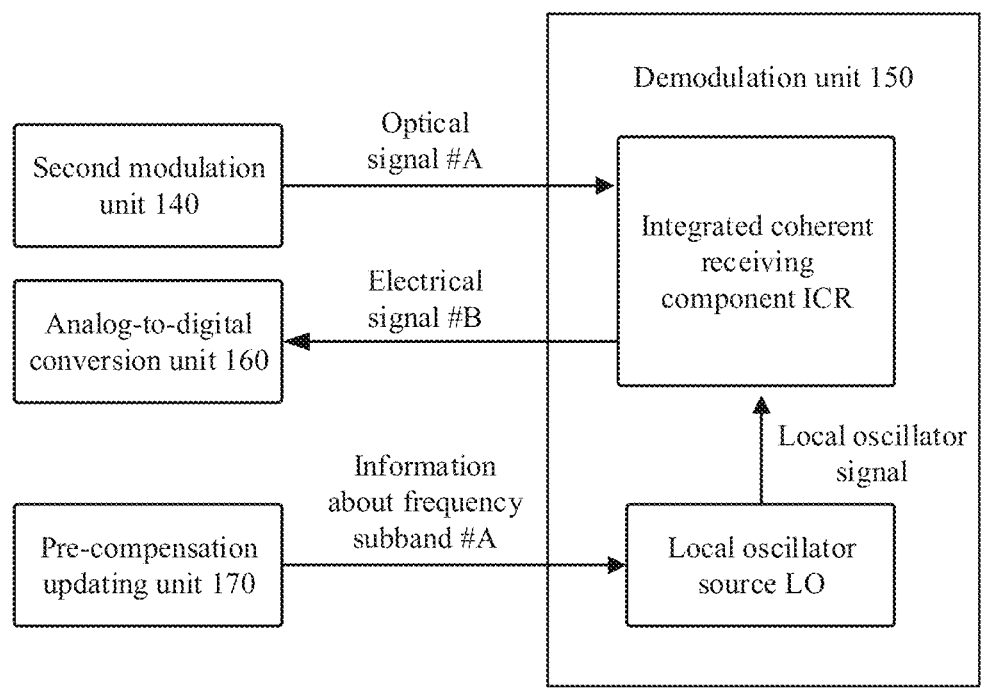
FIG. 3 is a schematic diagram of an example of a demodulation unit according to an embodiment of this application.

As shown in FIG. 3, in this application, the demodulation unit 150 may include an integrated coherent receiver (ICR) and a local oscillator (LO).

The local oscillator may also be referred to as a local oscillator source, and is configured to generate a local oscillator signal (that is, the foregoing reference signal).

The ICR is configured to: combine the local oscillator signal with a to-be-demodulated optical signal and then perform optical-to-electrical conversion on the combination of the local oscillator signal and the to-be-demodulated optical signal in two differential photodetectors. Output of the local oscillator has polarization-multiplexed orthogonal polarization components with different optical frequencies.

In this application, a frequency bandwidth of an optical signal demodulated by the ICR may be less than or equal to a frequency bandwidth of the foregoing optical signal #A. In other words, a part of the frequency band of the optical signal #A may be demodulated in the demodulation process of the ICR.

In this application, the frequency band of the optical signal #A may be divided into a plurality of frequency subbands and the ICR may demodulate a signal on one frequency subband.

Division of the plurality of frequency subbands may be performed by the pre-compensation parameter updating unit 170, or may be performed by another software module, such as a frequency band division module. For example, the pre-compensation parameter updating unit 170 may determine a quantity of frequency subbands, a size of each frequency subband, or the like.

Alternatively, a division manner of the plurality of frequency subbands may be specified by a communications system or a communications protocol. This is not particularly limited in this application.

It should be noted that the sizes (or bandwidths) of any two frequency subbands in the plurality of frequency subbands may be the same. Alternatively, the plurality of frequency subbands may include at least two frequency subbands with different sizes. This is not particularly limited in this application.

Assuming that a bandwidth of each frequency subband is X, and assuming that a bandwidth of the optical signal demodulated by the ICR is Y, Y is greater than or equal to X.

For example, when an optical signal on a frequency subband #A is demodulated, the LO may generate a local oscillator signal whose center frequency is the same as or close to a center frequency of the frequency subband #A (that is, a center frequency deviation is within a preset range).

In addition, because the bandwidth demodulated by the ICR is greater than or equal to a width of the frequency subband #A, the ICR can complete demodulation of the optical signal on the frequency subband #A based on the local oscillator signal.

As an example rather than a limitation, in this application, when Y is greater than X, the demodulation unit 150 may further include a filter, to perform filtering processing on a demodulated signal, so that a frequency bandwidth of a signal after filtering processing is the same as or close to X.

In this application, the pre-compensation parameter updating unit 170 may send, to the demodulation unit 150, information (for example, a center frequency of a target frequency subband or a sequence number or an identifier of a target frequency subband in the plurality of frequency subbands) about a frequency subband (that is, the target frequency subband) that needs to be demodulated in the plurality of frequency subbands. In this way, the demodulation unit 150 may demodulate an optical signal in the target frequency subband according to an indication of the pre-compensation parameter updating unit 170.

There may be one or more target frequency subbands. This is not particularly limited in this application.

In addition, the target frequency subband (for example, a quantity and a position of the target frequency subband) may be determined by the pre-compensation parameter updating unit 170, may be executed by another software module, such as a frequency band selection module, or may be specified by the communications system or the communications protocol. This is not particularly limited in this application.

In addition, when there are a plurality of target frequency subbands, the plurality of target frequency subbands may be selected from the plurality of frequency subbands at equal intervals. As an example rather than a limitation, the interval may include but is not limited to one frequency subband.

Figure 6:
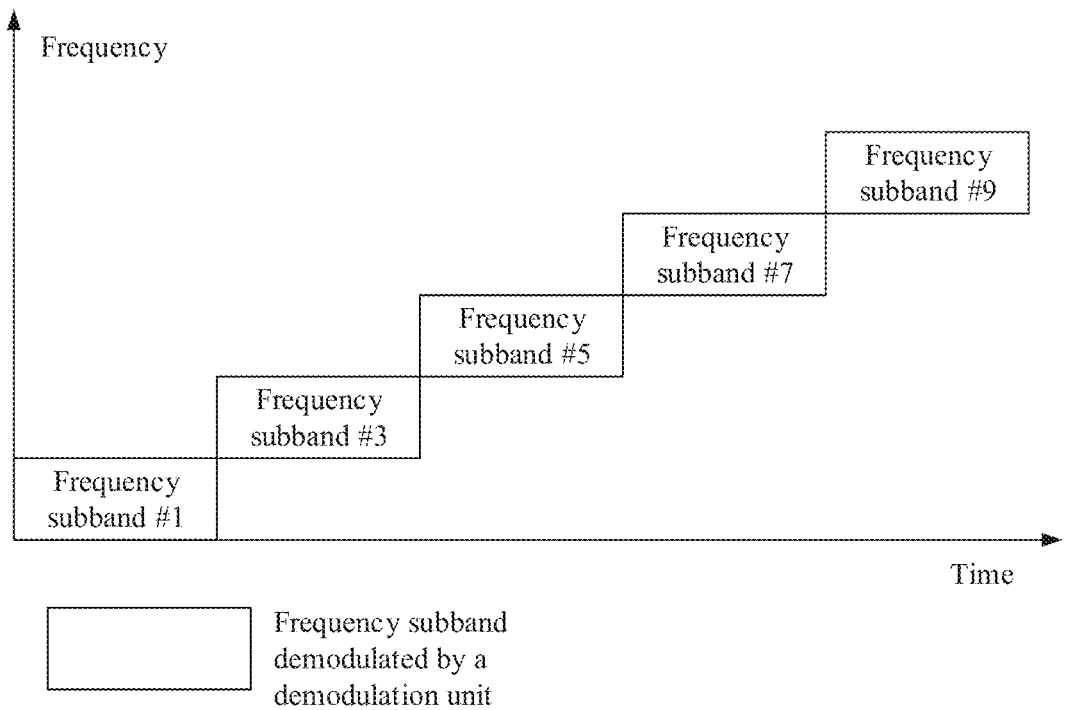
FIG. 6 is a schematic diagram of an example of a target frequency subband according to an embodiment of this application.

For example, as shown in FIG. 6, assuming that the plurality of frequency subbands are marked with sequence numbers in ascending order of frequencies, the target frequency subbands may be frequency subbands whose sequence numbers are 1, 3, 5, 7, 9, . . . .

For ease of understanding, an electrical signal obtained after demodulating a signal on the frequency subband #A (that is, an example of the target frequency subband) is denoted as an electrical signal #B, and a process of processing the electrical signal #B is used as an example for description below.

6. Analog-to-Digital Conversion Unit 160

The analog-to-digital conversion unit 160 is configured to perform analog-to-digital conversion on the electrical signal #B to obtain an electrical signal #B'. This process may be similar to that in the conventional technology. To avoid repetition, detailed description thereof is omitted.

7. Pre-Compensation Parameter Updating Unit 170

Figure 4:
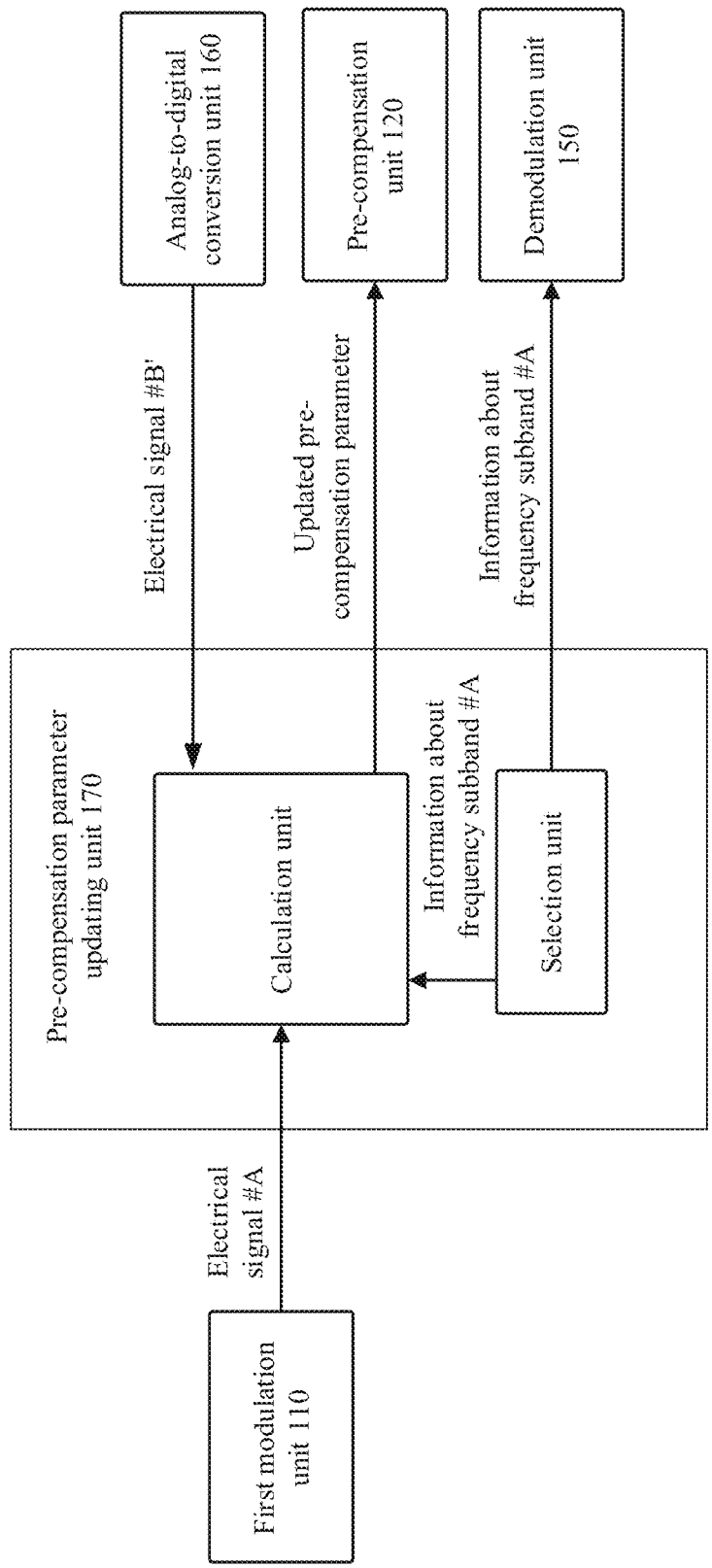
FIG. 4 is a schematic diagram of an example of a pre-compensation updating unit according to this application.

As shown in FIG. 4, the pre-compensation parameter updating unit 170 in this application may include a calculation unit and a selection unit.

The selection unit of the pre-compensation parameter updating unit 170 is configured to: divide the frequency band of the optical signal #A into a plurality of frequency subbands, and select at least one target frequency subband from the plurality of frequency subbands. This process is similar to the frequency subband division process described in the demodulation process of the demodulation unit 150 described above. To avoid repetition, detailed description thereof is omitted herein.

In addition, the selection unit of the pre-compensation parameter updating unit 170 may send information about each target frequency subband, for example, a center frequency of the target frequency subband or a sequence number of the target frequency subband, to the demodulation unit 150 (specifically, to the LO of the demodulation unit 150) through the second output port.

The calculation unit of the pre-compensation parameter updating unit 170 is configured to: obtain an electrical signal corresponding to each target frequency subband from the analog-to-digital conversion unit 160 through the second input port, obtain the electrical signal from the first modulation unit 110 through the first input port, and further update a pre-compensation parameter used by the pre-compensation module 120.

For ease of understanding, a process of updating an electrical signal corresponding to the frequency subband #A (that is, an example of the target frequency subband) is used as an example for description below.

The calculation unit of the pre-compensation parameter updating unit 170 is configured to determine a symbol subsequence #C from the electrical signal #A (specifically, from a symbol sequence of the electrical signal #A) based on the frequency subband #A (that is, an example of the target frequency subband). If the electrical signal #A is converted from the time domain signal to a frequency domain signal (denoted as a frequency domain signal #D), assuming that a position of a frequency domain signal corresponding to the symbol subsequence #C in a frequency band of the frequency domain signal #D is a position #1 and assuming that a frequency domain position of the frequency subband #A in the frequency band of the optical signal #A is a position #2, a deviation (for example, a center frequency deviation) between the position #1 and the position #2 falls within a preset range.

Then, the calculation unit of the pre-compensation parameter updating unit 170 may determine a deviation value (or a magnitude of deviation) between the symbol subsequence #C and a symbol sequence of the electrical signal #B', and the deviation value is denoted as a deviation value #A.

Further, the calculation unit of the pre-compensation parameter updating unit 170 may update (or calibrate), based on the deviation value #A, the pre-compensation parameter used by the pre-compensation unit 120.

As an example rather than a limitation, as described above, there may be a plurality of target frequency subbands. In this case, the calculation unit of the pre-compensation parameter updating unit 170 may obtain a deviation corresponding to each target frequency subband based on a process similar to the foregoing process of processing the frequency subband #A. Deviations corresponding to the plurality of target frequency subbands may be concurrently computed, or may be computed for a plurality of times.

For example, in the case of computation for a plurality of times, each time of computation corresponds to one time period, and each computation process corresponds to a process of processing one target frequency subband. The pre-compensation parameter updating unit 170 sends information about one target frequency subband to the demodulation unit 150 in one computation process (or in one time period), so as to obtain an electrical signal subject to demodulation and analog-to-digital conversion processing on the target frequency subband from the analog-to-digital conversion unit 160. In addition, in the same computation process (or in the same time period), the pre-compensation parameter updating unit 170 determines a symbol sequence corresponding to the target frequency subband from the electrical signal from the first modulation unit 110 based on a target frequency subband processed in the time period, and further determine a deviation value corresponding to the target frequency subband.

For example, in the case of concurrent computation, the pre-compensation parameter updating unit 170 obtains a plurality of electrical signals from the analog-to-digital conversion unit 160, and the demodulation unit 150 may send a correspondence between the plurality of electrical signals and the plurality of target frequency subbands to the pre-compensation parameter updating unit 170. For example, the plurality of electrical signals may be numbered (or sorted) based on a transmission sequence, and information about a target frequency subband corresponding to each electrical signal (for example, an identifier of the target frequency subband or a sequence number of the target frequency subband in the plurality of frequency subbands of the optical signal) is sequentially sent based on a transmission sequence of the electrical signals. In this way, the pre-compensation parameter updating unit 170 can determine the target frequency subband corresponding to each electrical signal based on the foregoing correspondence, and further determine a symbol sequence corresponding to the target frequency subband in the electrical signal from the first modulation unit 110 based on the target frequency subband corresponding to each electrical signal, thereby determining the deviation value corresponding to the target frequency subband.

In this application, the pre-compensation parameter updating unit 170 may update the pre-compensation parameter based on an average (for example, an arithmetic mean or a weighted mean) of the foregoing deviation values.

In addition, when the pre-compensation parameter is updated by using the weighted mean of the deviation values, a weight of each deviation may be determined based on a position of a target frequency subband corresponding to the deviation value.

For example, a weight of the deviation value #A may be determined by the position #2.

A correspondence between a weight of each deviation value and a position of the frequency subband may be determined based on an actual requirement or a manner such as an experiment. This is not particularly limited in this application.

Figure 5:
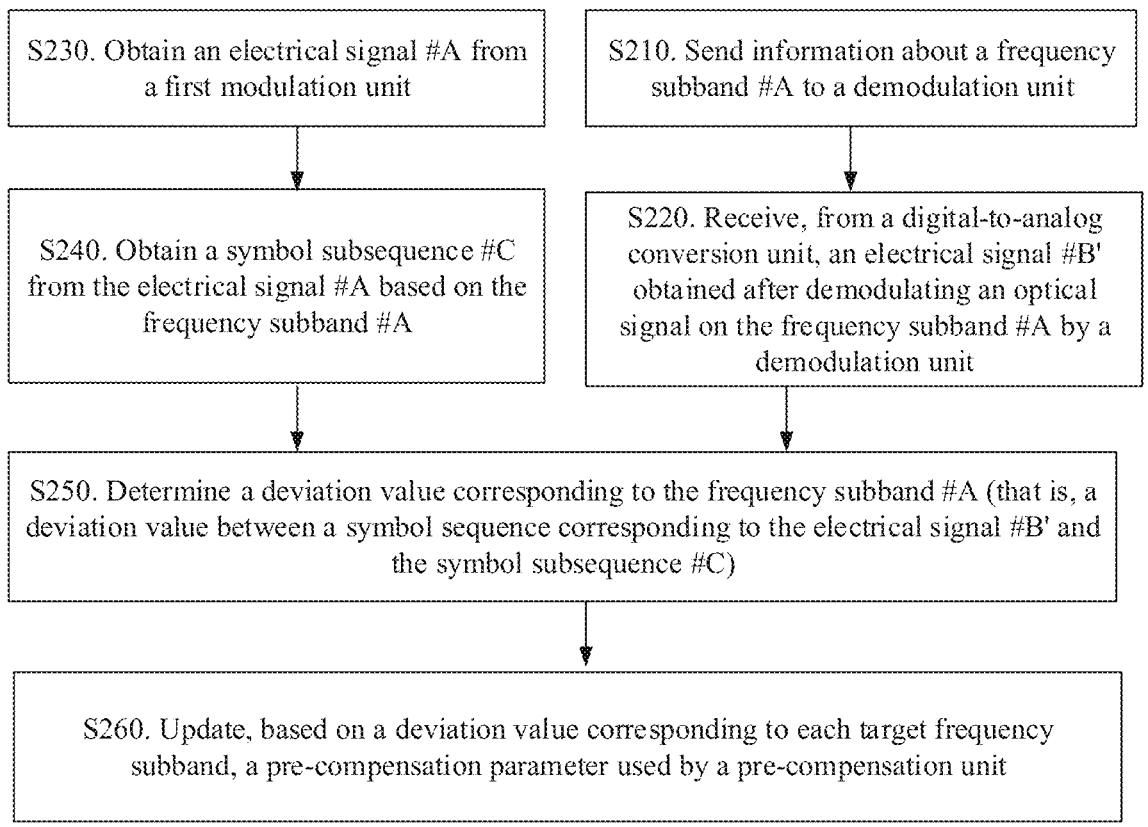
FIG. 5 is a schematic flowchart of a signal pre-compensation method according to an embodiment of this application.

FIG. 5 is a schematic flowchart of a process performed by the pre-compensation parameter updating unit 170. As shown in FIG. 5, in S210, the pre-compensation parameter updating unit 170 may (for example, through transmission by using an internal bus or the like) send an instruction #1 to the demodulation unit 150 (for example, the LO of the demodulation unit 150), where the instruction #1 instructs the demodulation unit 150 to demodulate a part of the optical signal #A carried on the frequency subband #A.

In S220, the pre-compensation parameter updating unit 170 obtains the foregoing signal #B' from the analog-to-digital conversion unit 160.

In S230, the pre-compensation parameter updating unit 170 obtains the electrical signal #A from the first modulation unit 110.

In S240, the pre-compensation parameter updating unit 170 may obtain the foregoing symbol subsequence #C from the electrical signal #A based on the frequency subband #A (for example, a width and a position of the frequency subband #A).

In S250, the pre-compensation parameter updating unit 170 may determine the deviation value between the symbol subsequence #C and a symbol sequence corresponding to the foregoing signal #B', that is, a deviation value corresponding to the frequency subband #A.

Based on a similar process, the pre-compensation parameter updating unit 170 may determine a deviation value corresponding to each target frequency subband.

In S260, the pre-compensation parameter updating unit 170 may update the pre-compensation parameter used by the pre-compensation unit 120, based on the deviation value (for example, the average of the deviation values) corresponding to each target frequency subband.

According to the solutions provided in this application, an optical signal sending device pre-compensates and modulates the second electrical signal to obtain a to-be-sent first optical signal, and demodulates the first optical signal to obtain a first electrical signal, so that the pre-compensation parameter used for pre-compensation can be updated based on the first electrical signal and the second electrical signal. To be specific, according to the method provided in this application, updating of the pre-compensation parameter does not need to depend on feedback information from an optical signal receiving device, thereby reducing system configuration costs generated by configuring a feedback channel, shortening a delay of updating the pre-compensation parameter, improving accuracy of pre-compensation processing, and further improving communication performance.

In addition, according to the solutions provided in this application, demodulation of the first optical signal is demodulation of a part of the first optical signal carried on the target frequency subband, thereby lowering a requirement for the bandwidth of the demodulation device, making it easy to implement demodulation processing, and reducing the costs of the optical signal sending device. Therefore, the practicality of this application is further improved.

It should be understood that, in the foregoing description, the solution for dividing a frequency band of the optical signal is listed. However, this is not limited in this application. When performance of a decoding unit can support demodulation of an entire bandwidth of the optical signal, the frequency band of the optical signal may not be divided.

Figure 7:
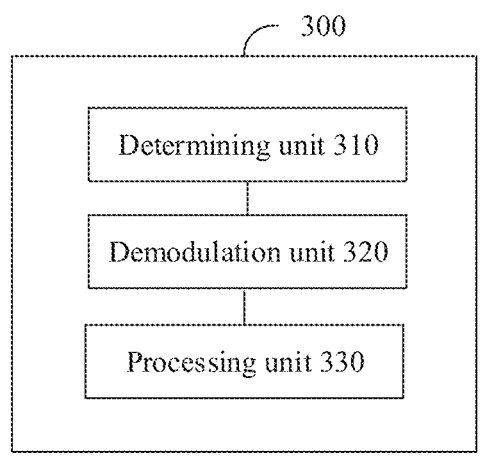
FIG. 7 is a schematic block diagram of a signal pre-compensation apparatus according to an embodiment of this application.

FIG. 7 is a schematic block diagram of a signal pre-compensation apparatus 300 according to an embodiment of this application. The apparatus 300 includes a determining unit 310, a demodulation unit 320, and a processing unit 330.

The determining unit 310 is configured to determine at least one target frequency subband from a plurality of frequency subbands, where the plurality of frequency subbands are frequency subbands in a frequency band of a first optical signal generated by the optical signal sending device.

The demodulation unit 320 is configured to: demodulate an optical signal of the at least one target frequency subband in the first optical signal based on the at least one target frequency subband, and obtain a first electrical signal after demodulation.

The processing unit 330 is configured to update a pre-compensation parameter based on the at least one target frequency subband, the first electrical signal, and a second electrical signal, where the pre-compensation parameter is used to perform signal pre-compensation on the second electrical signal, and the first optical signal is generated after the pre-compensation is performed on the second electrical signal.

Optionally, the demodulation unit is configured to generate at least one local oscillator signal based on the at least one target frequency subband, where the at least one target frequency subband is in a one-to-one correspondence with the at least one local oscillator signal, and a deviation between a center frequency of each local oscillator signal and a center frequency of a corresponding target frequency subband falls within a first preset range, and is configured to demodulate the first optical signal based on the at least one local oscillator signal and a first demodulation bandwidth, where the first demodulation bandwidth is greater than or equal to a frequency bandwidth of the target frequency subband.

Optionally, the at least one target frequency subband is a plurality of target frequency subbands, the plurality of target frequency subbands are in a one-to-one correspondence with a plurality of first electrical signals, and each first electrical signal is obtained after an optical signal of a corresponding target frequency subband is demodulated.

Optionally, the processing unit is configured to determine a first symbol subsequence from a symbol sequence of the second electrical signal based on the target frequency subband, where a deviation between the first position and the second position falls within a second preset range, the first position is a position of the first symbol subsequence in the symbol sequence of the second electrical signal, and the second position is determined based on a position of the target frequency subband in the plurality of frequency subbands, and is configured to update the pre-compensation parameter based on the difference between the symbol sequence of the first electrical signal and the first symbol subsequence.

Optionally, the processing unit is configured to determine a first weight based on the frequency band position of the target frequency subband in the plurality of frequency subbands, and is configured to update the pre-compensation parameter based on the first weight and the difference between the symbol sequence of the first electrical signal and the first symbol subsequence.

Optionally, the plurality of frequency subbands have the same frequency bandwidth.

Optionally, the at least one target frequency subband is a plurality of target frequency subbands, and the plurality of target frequency subbands are selected from the plurality of frequency subbands at an equal frequency band interval.

Optionally, the frequency band interval is one frequency subband.

The determining unit 310 is configured to perform related processes of frequency subband division and target frequency subband selection and indication that are performed by the pre-compensation parameter updating unit 170 (for example, an action performed by a selection unit of the pre-compensation parameter updating unit 170). To avoid repetition, detailed description thereof is omitted herein.

The demodulation unit 320 is configured to perform a related process of optical signal demodulation performed by the demodulation unit 150. To avoid repetition, detailed description thereof is omitted herein.

The processing unit 330 is configured to perform a related process of calculating the deviation value and updating the pre-compensation parameter based on the deviation value (for example, an action performed by a calculation unit of the pre-compensation parameter updating unit 170). To avoid repetition, detailed description thereof is omitted herein.

Figure 8:
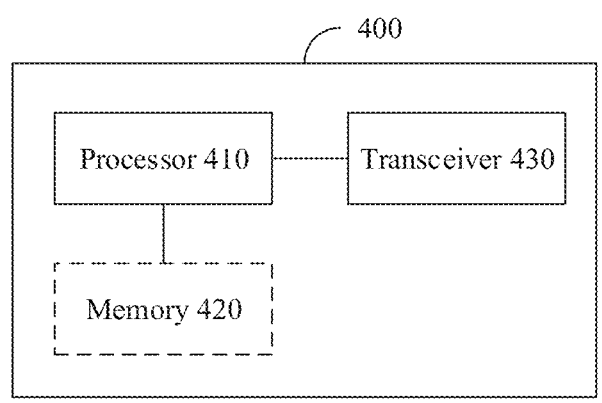
FIG. 8 is another schematic block diagram of a signal pre-compensation apparatus according to an embodiment of this application.

As shown in FIG. 8, an embodiment of this application further provides a communications apparatus 400. The communications apparatus 400 includes a processor 410. The processor 410 is coupled to a memory 420. The memory 420 is configured to store a computer program or instructions and/or data. The processor 410 is configured to execute the computer program or instructions and/or data stored in the memory 420, so that the method in the foregoing method embodiment is performed.

Optionally, the communications apparatus 400 includes one or more processors 410.

Optionally, as shown in FIG. 8, the communications apparatus 400 may further include a memory 420.

Optionally, the communications apparatus 400 may include one or more memories 420.

Optionally, the memory 420 may be integrated with or disposed separately from the processor 410.

Optionally, as shown in FIG. 8, the wireless communications apparatus 400 may further include a transceiver 430, and the transceiver 430 is configured to receive and/or send a signal. For example, the processor 410 is configured to control the transceiver 430 to receive and/or send a signal.

In a solution, the communications apparatus 400 is configured to implement operations performed by units in a sending device in the foregoing method embodiment.

For example, the processor 410 is configured to implement an operation related to the processing performed by the pre-compensation parameter updating unit 170 in the foregoing method embodiment.

An embodiment of this application further provides a computer-readable storage medium. The computer-readable storage medium stores computer instructions that are used to implement the method performed by the sending device (for example, the pre-compensation parameter updating unit 170) in the foregoing method embodiment.

An embodiment of this application further provides a computer program product. When the computer program product is executed by a computer, the computer is enabled to implement the method performed by the sending device (for example, the pre-compensation parameter updating unit 170) in the foregoing method embodiment.

An embodiment of this application further provides a communications system. The communications system includes the sending device in the foregoing embodiments.

In an example, the communications system includes the sending device and the receiving device in the foregoing embodiments.

For explanations and beneficial effects of related content of any wireless communications apparatus provided above, refer to a corresponding method embodiment provided above. Details are not described herein again.

In some embodiments of this application, the communications device may include a hardware layer, an operating system layer running above the hardware layer, and an application layer running above the operating system layer. The hardware layer may include hardware such as a central processing unit (CPU), a memory management unit (MMU), and a memory (which is also referred to as a main memory). An operating system of the operating system layer may be any one or more of computer operating systems implementing service processing by using a process, for example, a Linux operating system, a Unix operating system, an Android operating system, an iOS operating system, or a Windows operating system. The application layer may include applications such as a browser, an address book, word processing software, and instant messaging software.

A specific structure of an execution body of the method provided in embodiments of this application is not specifically limited in embodiments of this application, provided that a program that records code of the method provided in embodiments of this application can be run to perform communication according to the method provided in embodiments of this application. For example, the execution body of the method provided in this embodiment of this application may be a terminal device or a satellite, or may be a functional module that is in the terminal device or the satellite and that can invoke and execute the program.

Aspects or features in embodiments of this application may be implemented as a method, an apparatus, or a product that uses standard programming and/or engineering technologies. The term "product" used in this specification may cover a computer program that can be accessed from any computer-readable device, carrier, or medium. For example, a computer-readable medium may include but is not limited to: a magnetic storage device (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive).

Various storage media described in this specification may represent one or more devices and/or other machine-readable media that are configured to store information. The term "machine-readable media" may include but is not limited to a radio channel and various other media that can store, include, and/or carry instructions and/or data.

It should be understood that the processor mentioned in embodiments of this application may be a central processing unit (CPU), or the processor may be another general-purpose processor, a digital signal processor (DSP), an application-specific integrated circuit (ASIC), a field programmable gate array (FPGA), another programmable logic device, a discrete gate or transistor logic device, a discrete hardware component, or the like. The general-purpose processor may be a microprocessor, or the processor may be any conventional processor, or the like.

It should further be understood that the memory in embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM). For example, the RAM may be used as an external cache. As an example rather than a limitation, the RAM may include a plurality of the following forms: a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA, another programmable logic device, a discrete gate or a transistor logic device, or a discrete hardware component, the memory (storage module) may be integrated into the processor.

It should be further noted that the memories described in this specification are intended to include but are not limited to these memories and any memory of another proper type.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of embodiments of this application.

It may be clearly understood by a person skilled in the art that, for convenience and brevity of description, for a specific working process of the foregoing system, apparatus, and unit, refer to a corresponding process in the method embodiment. Details are not described herein again.

In several embodiments provided in embodiments of this application, it should be understood that the disclosed system, apparatus, and method may be implemented in another manner. For example, the described apparatus embodiments are merely examples. For example, the division into units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions in embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of embodiments of this application essentially, or the part contributing to the prior art, or a part of the technical solutions may be implemented in a form of a software product. The software product is stored in a storage medium and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in embodiments of this application shall fall within the protection scope of this application. Therefore, the protection scope of this application shall be subject to the protection scope of the claims.

What is claimed is:

1. A signal pre-compensation method, wherein the method is applied to an optical signal sending device, and comprises:
    determining a target frequency subband from a plurality of frequency subbands, wherein the plurality of frequency subbands are frequency subbands in a frequency band of a first optical signal generated by the optical signal sending device;
    demodulating an optical signal of the target frequency subband in the first optical signal based on the target frequency subband, and obtaining a first electrical signal after demodulation;
    updating a pre-compensation parameter based on the target frequency subband, the first electrical signal, and a second electrical signal, wherein the pre-compensation parameter is used to perform signal pre-compensation on the second electrical signal;
    generating the first optical signal after the pre-compensation is performed on the second electrical signal; and
    wherein the target frequency subband comprises a plurality of target frequency subbands, the plurality of target frequency subbands are in a one-to-one correspondence with a plurality of first electrical signals, and each first electrical signal is obtained after an optical signal of a corresponding target frequency subband is demodulated.

2. The method according to claim 1, wherein the demodulating an optical signal of the target frequency subband in the first optical signal based on the target frequency subband comprises:
    generating at least one local oscillator signal based on the target frequency subband, wherein the target frequency subband is in a one-to-one correspondence with the at least one local oscillator signal, and a deviation between a center frequency of each local oscillator signal and a center frequency of a corresponding target frequency subband falls within a first preset range; and
    demodulating the first optical signal based on the at least one local oscillator signal and a first demodulation bandwidth, wherein the first demodulation bandwidth is greater than or equal to a frequency bandwidth of the target frequency subband.

3. The method according to claim 1, wherein the updating a pre-compensation parameter based on the target frequency subband, the first electrical signal, and a second electrical signal comprises:
    determining a first symbol subsequence from a symbol sequence of the second electrical signal based on the target frequency subband, wherein a position of the first symbol subsequence in the symbol sequence of the second electrical signal is a first position, a position of the target frequency subband in the plurality of frequency subbands is a second position, and a deviation between the first position and the second position falls within a second preset range; and
    updating the pre-compensation parameter based on a difference between a symbol sequence of the first electrical signal and the first symbol subsequence.

4. The method according to claim 3, wherein the updating the pre-compensation parameter based on a difference between a symbol sequence of the first electrical signal and the first symbol subsequence comprises:
    determining a first weight based on the frequency band position of the target frequency subband in the plurality of frequency subbands; and
    updating the pre-compensation parameter based on the first weight and the difference between the symbol sequence of the first electrical signal and the first symbol subsequence.

5. The method according to claim 1, wherein the plurality of frequency subbands have a same frequency bandwidth.

6. The method according to claim 1, wherein the plurality of target frequency subbands are selected from the plurality of frequency subbands at an equal frequency band interval.

7. The method according to claim 6, wherein the frequency band interval is one frequency subband.

8. A signal pre-compensation apparatus, comprising: a computing hardware; and
a computer-readable storage medium including computer-executable instructions executed by the computing hardware to perform operations comprising:
determining a target frequency subband from a plurality of frequency subbands, wherein the plurality of frequency subbands are frequency subbands in a frequency band of the optical signal sending device;
demodulating an optical signal of the target frequency subband in the first optical signal based on the target frequency subband, and obtaining a first electrical signal after demodulation;
updating a pre-compensation parameter based on the target frequency subband, the first electrical signal, and a second electrical signal, wherein the pre-compensation parameter is used to perform signal pre-compensation on the second electrical signal;
generating the first optical signal after the pre-compensation is performed on the second electrical signal; and
wherein the target frequency subband comprises a plurality of target frequency subbands, the plurality of target frequency subbands are in a one-to-one correspondence with a plurality of first electrical signals, and each first electrical signal is obtained after an optical signal of a corresponding target frequency subband is demodulated.

9. The apparatus according to claim 8, wherein the computing hardware is configured with computer-executable instructions to perform operations such that the demodulating an optical signal of the target frequency subband in the first optical signal based on the target frequency subband comprises:
generating at least one local oscillator signal based on the target frequency subband, wherein the target frequency subband is in a one-to-one correspondence with the at least one local oscillator signal, and a deviation between a center frequency of each local oscillator signal and a center frequency of a corresponding target frequency subband falls within a first preset range; and
demodulating the first optical signal based on the at least one local oscillator signal and a first demodulation bandwidth, wherein the first demodulation bandwidth is greater than or equal to a frequency bandwidth of the target frequency subband.

10. The apparatus according to claim 8, wherein the updating a pre-compensation parameter based on the target frequency subband, the first electrical signal, and a second electrical signal comprises:
determining a first symbol subsequence from a symbol sequence of the second electrical signal based on the target frequency subband, wherein a position of the first symbol subsequence in the symbol sequence of the second electrical signal is a first position, a position of the target frequency subband in the plurality of frequency subbands is a second position, and a deviation between the first position and the second position falls within a second preset range; and
updating the pre-compensation parameter based on a difference between a symbol sequence of the first electrical signal and the first symbol subsequence.

11. The apparatus according to claim 10, wherein the updating the pre-compensation parameter based on a difference between a symbol sequence of the first electrical signal and the first symbol subsequence comprises:
determining a first weight based on the frequency band position of the target frequency subband in the plurality of frequency subbands; and
updating the pre-compensation parameter based on the first weight and the difference between the symbol sequence of the first electrical signal and the first symbol subsequence.

12. The apparatus according to claim 8, wherein the plurality of frequency subbands have a same frequency bandwidth.

13. The apparatus according to claim 8, wherein the plurality of target frequency subbands are selected from the plurality of frequency subbands at an equal frequency band interval.

14. The apparatus according to claim 13, wherein the frequency band interval is one frequency subband.

15. The apparatus according to claim 8, wherein the signal pre-compensation apparatus is a chip.

* * * * *